US012785170B2

(12) United States Patent
Yun et al.

(10) Patent No.: US 12,785,170 B2
(45) Date of Patent: Nov. 3, 2026

(54) BATTERY PACK AND DEVICE INCLUDING THE SAME

(71) Applicant: LG ENERGY SOLUTION, LTD., Seoul (KR)

(72) Inventors: Hyun Seop Yun, Daejeon (KR); Won Kyoung Park, Daejeon (KR); Junyeob Seong, Daejeon (KR); Honggoo Han, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 807 days.

(21) Appl. No.: 18/019,689

(22) PCT Filed: Oct. 15, 2021

(86) PCT No.: PCT/KR2021/014340
§ 371 (c)(1),
(2) Date: Feb. 3, 2023

(87) PCT Pub. No.: WO2022/080936
PCT Pub. Date: Apr. 21, 2022

(65) Prior Publication Data

US 2024/0258607 A1 Aug. 1, 2024

(30) Foreign Application Priority Data

Oct. 16, 2020 (KR) ........................ 10-2020-0134032

(51) Int. Cl.
*H01M 10/6554* (2014.01)
*H01M 10/613* (2014.01)
(Continued)

(52) U.S. Cl.
CPC ... *H01M 10/6554* (2015.04); *H01M 10/6556* (2015.04); *H01M 10/6567* (2015.04);
(Continued)

(58) Field of Classification Search
CPC ......... H01M 10/6554; H01M 10/6556; H01M 10/6567; H01M 50/258; H01M 50/271;
(Continued)

(56) References Cited

U.S. PATENT DOCUMENTS

2011/0293974 A1* 12/2011 Yoon .................. H01M 10/613 429/72
2012/0315529 A1 12/2012 Jin
(Continued)

FOREIGN PATENT DOCUMENTS

CN 103311597 A 9/2013
CN 104779419 A 7/2015
(Continued)

OTHER PUBLICATIONS

Extended European Search Report for European Application No. 21880583.6, dated Jul. 24, 2024.
(Continued)

*Primary Examiner* — Lisa S Park
(74) *Attorney, Agent, or Firm* — Birch, Stewart, Kolasch & Birch, LLP

(57) ABSTRACT

A battery pack having a first battery module including a first battery cell stack in which a plurality of first battery cells are stacked, a first module frame for accommodating the first battery cell stack, and a first cooling plate located below a bottom portion of the first module frame, a second battery module including a second battery cell stack in which a plurality of second battery cells are stacked, a second module frame for accommodating the second battery cell stack, and a second cooling plate located below a bottom portion of the second module frame, a pack frame for accommodating the first and second battery modules, and a cooling pipe connecting the first cooling plate and the second cooling plate, the cooling pipe formed along one side
(Continued)

part of the first battery module is provided. The first cooling plate and the second cooling plate are vertically stacked.

12 Claims, 9 Drawing Sheets

(51) Int. Cl.
*H01M 10/6556* (2014.01)
*H01M 10/6567* (2014.01)
*H01M 50/258* (2021.01)
*H01M 50/271* (2021.01)

(52) U.S. Cl.
CPC ....... *H01M 50/258* (2021.01); *H01M 50/271* (2021.01); *H01M 10/613* (2015.04)

(58) Field of Classification Search
CPC ............. H01M 10/613; H01M 10/647; H01M 10/6568; H01M 10/625; H01M 50/209; H01M 50/249; H01M 50/262; H01M 10/0525; H01M 10/058; H01M 50/20; H01M 2220/20; Y02E 60/10; Y02P 70/50
See application file for complete search history.

(56) References Cited

U.S. PATENT DOCUMENTS

| | | | | |
|---|---|---|---|---|
| 2014/0057151 | A1 | 2/2014 | Chung et al. | |
| 2014/0370340 | A1 | 12/2014 | Kimura et al. | |
| 2015/0221922 | A1 | 8/2015 | Kim et al. | |
| 2016/0204486 | A1* | 7/2016 | Kenney | F28F 3/12 29/890.03 |
| 2017/0012330 | A1 | 1/2017 | Kim et al. | |
| 2017/0033419 | A1 | 2/2017 | Eom et al. | |
| 2018/0175466 | A1 | 6/2018 | Seo et al. | |
| 2018/0269545 | A1 | 9/2018 | Liu et al. | |
| 2019/0334141 | A1 | 10/2019 | Kwon et al. | |
| 2020/0028202 | A1 | 1/2020 | Miyoshi et al. | |
| 2020/0076026 | A1 | 3/2020 | Ohkuma | |
| 2021/0119282 | A1 | 4/2021 | Wünsche et al. | |
| 2024/0258607 | A1 | 8/2024 | Yun et al. | |

FOREIGN PATENT DOCUMENTS

| | | | |
|---|---|---|---|
| CN | 109585727 | A | 4/2019 |
| CN | 109859845 | A | 4/2019 |
| CN | 110380153 | A | 10/2019 |
| CN | 217655931 | U | 10/2022 |
| JP | 2013-187159 | A | 9/2013 |
| JP | 5795648 | B2 | 10/2015 |
| JP | 2016-29624 | A | 3/2016 |
| JP | 2020-13677 | A | 1/2020 |
| JP | 2020-35710 | A | 3/2020 |
| KR | 10-2011-0132124 | A | 12/2011 |
| KR | 10-2012-0138648 | A | 12/2012 |
| KR | 10-2013-0025244 | A | 3/2013 |
| KR | 10-2014-0062603 | A | 5/2014 |
| KR | 10-2014-0128845 | A | 11/2014 |
| KR | 10-2014-0144784 | A | 12/2014 |
| KR | 10-2015-0083438 | A | 7/2015 |
| KR | 10-2015-0099965 | A | 9/2015 |
| KR | 10-2018-0069989 | A | 6/2018 |
| KR | 10-2018-0085384 | A | 7/2018 |
| KR | 10-2019-0124483 | A | 11/2019 |
| KR | 10-2019-0131415 | A | 11/2019 |
| KR | 10-2058688 | B1 | 12/2019 |
| KR | 10-2020-0001705 | A | 1/2020 |
| WO | WO 2019/221376 | A1 | 11/2019 |

OTHER PUBLICATIONS

International Search Report for PCT/KR2021/014340 (PCT/ISA/210) mailed on Feb. 3, 2022.

* cited by examiner

【FIG. 1】
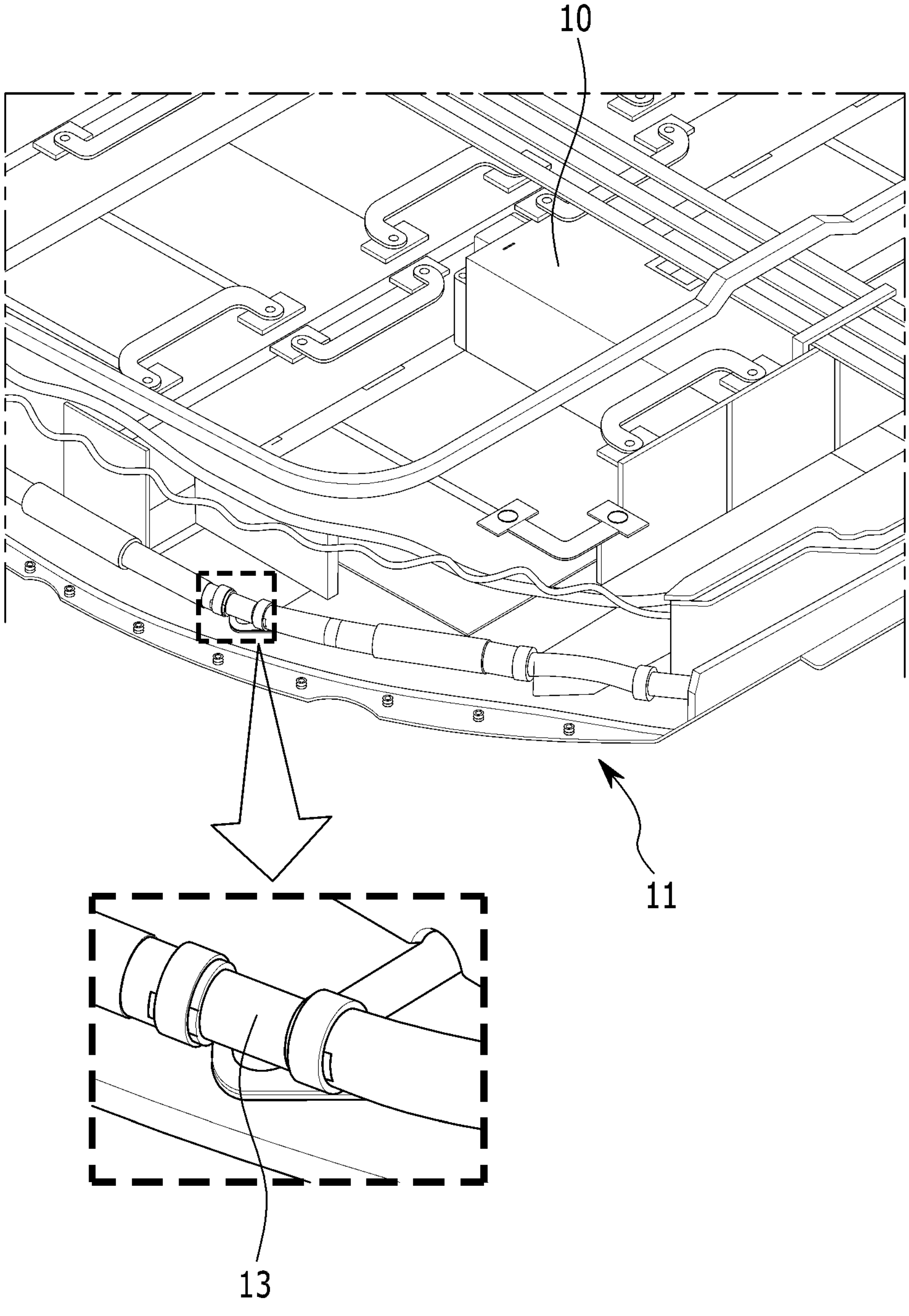

【FIG. 2】
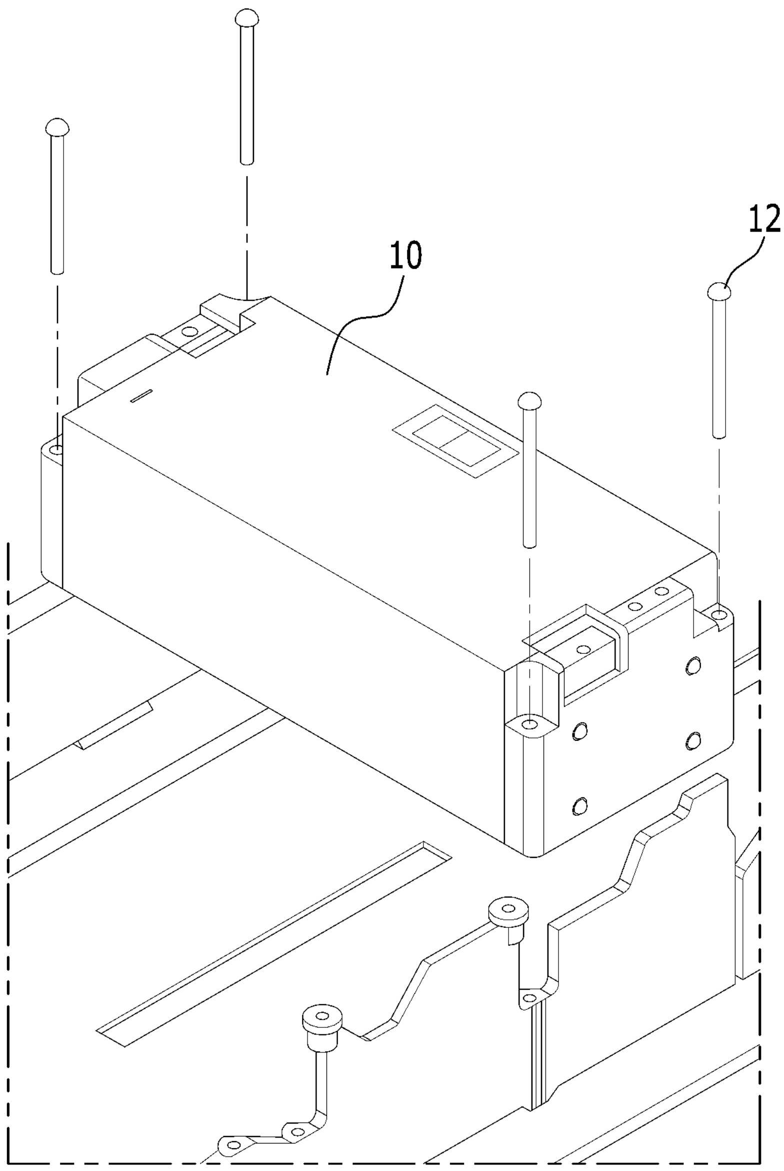

【FIG. 3】
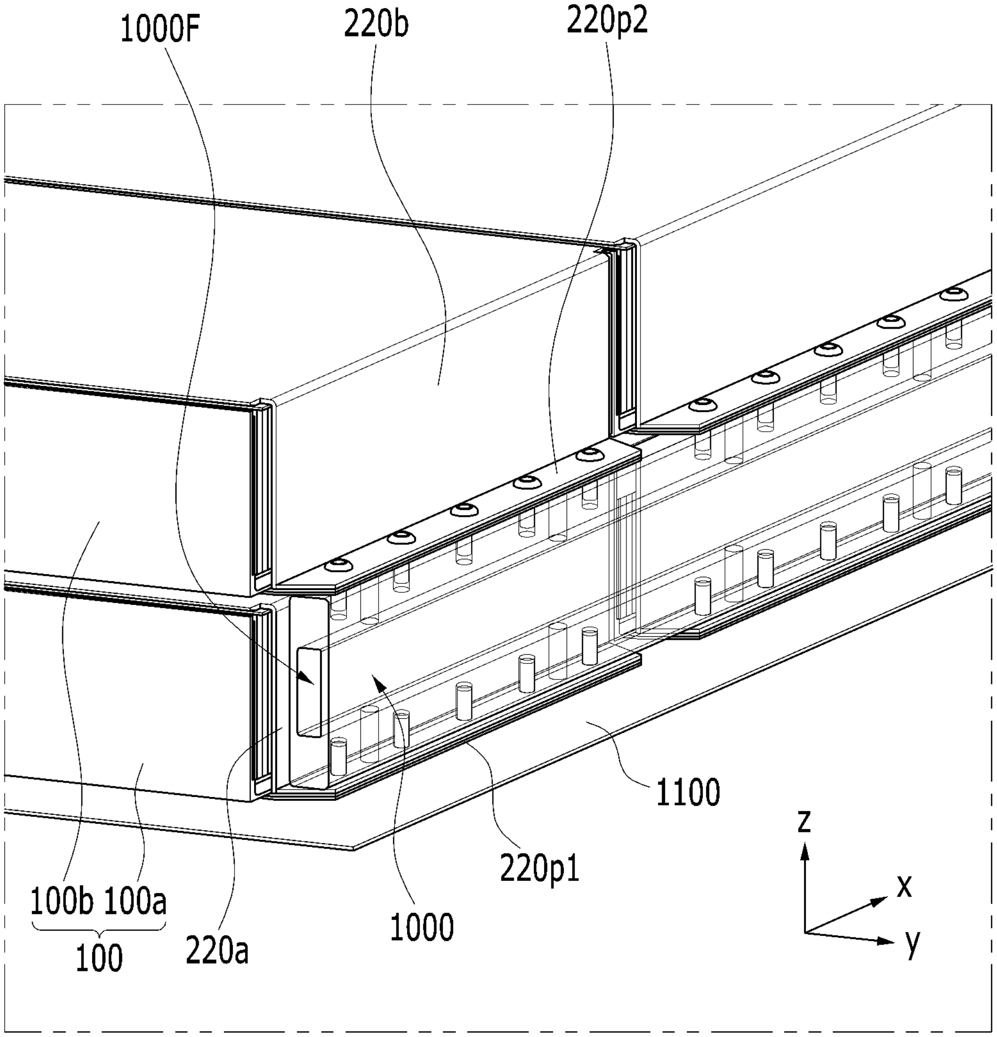

【FIG. 4】
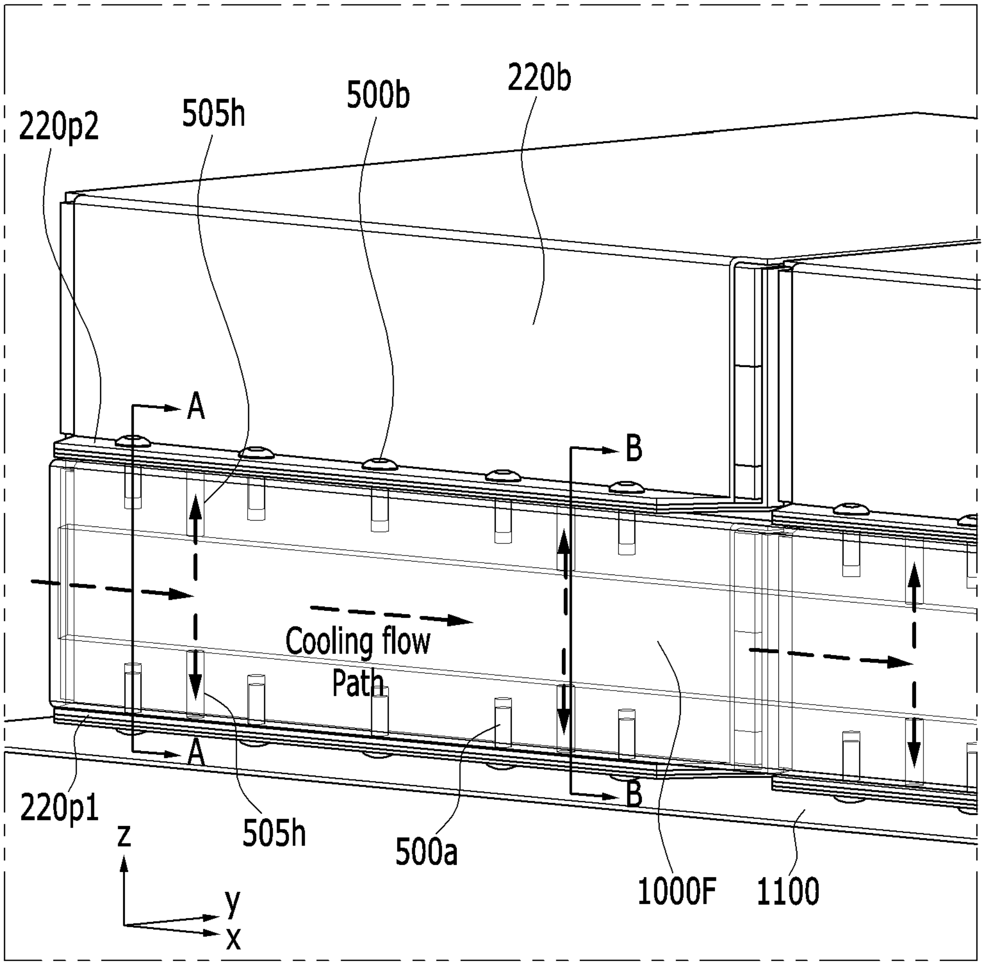

【FIG. 5】
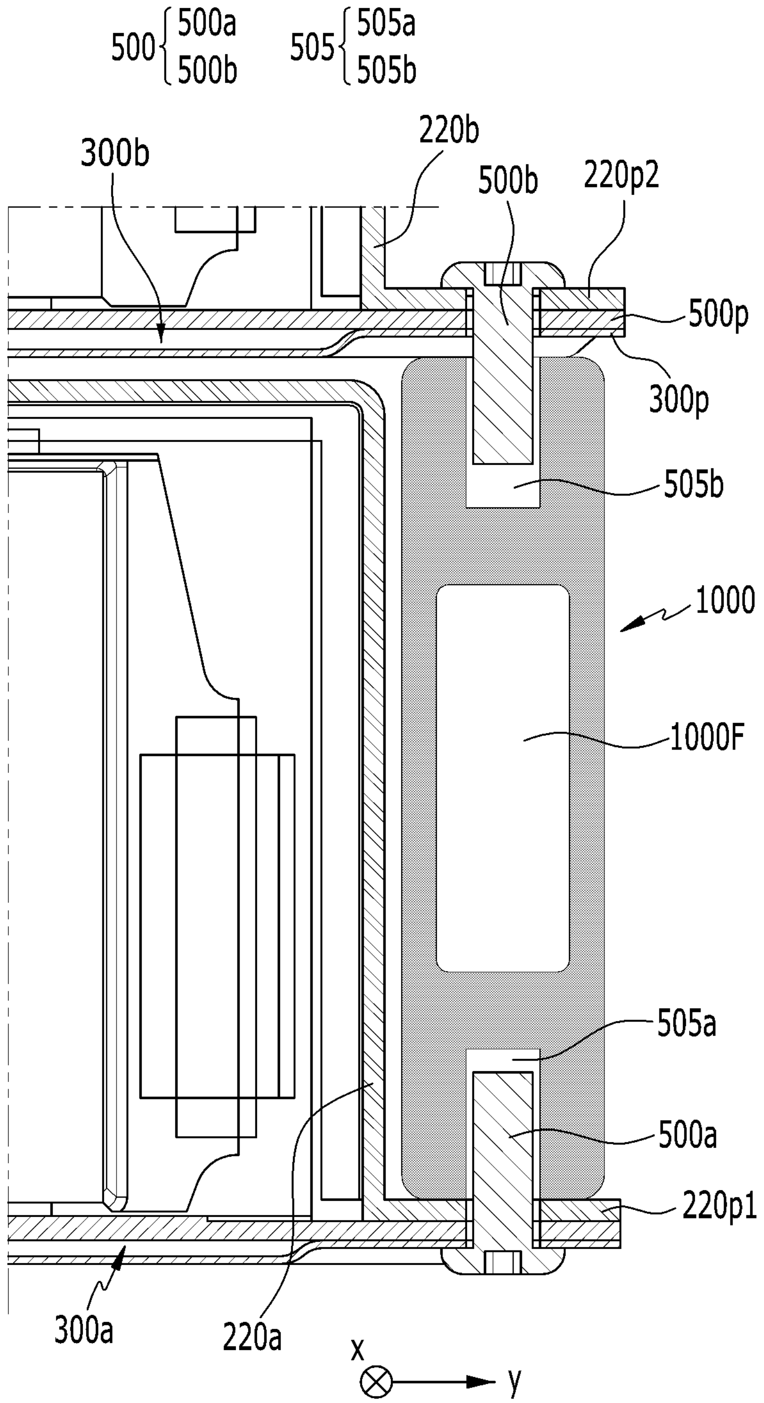

【FIG. 6】
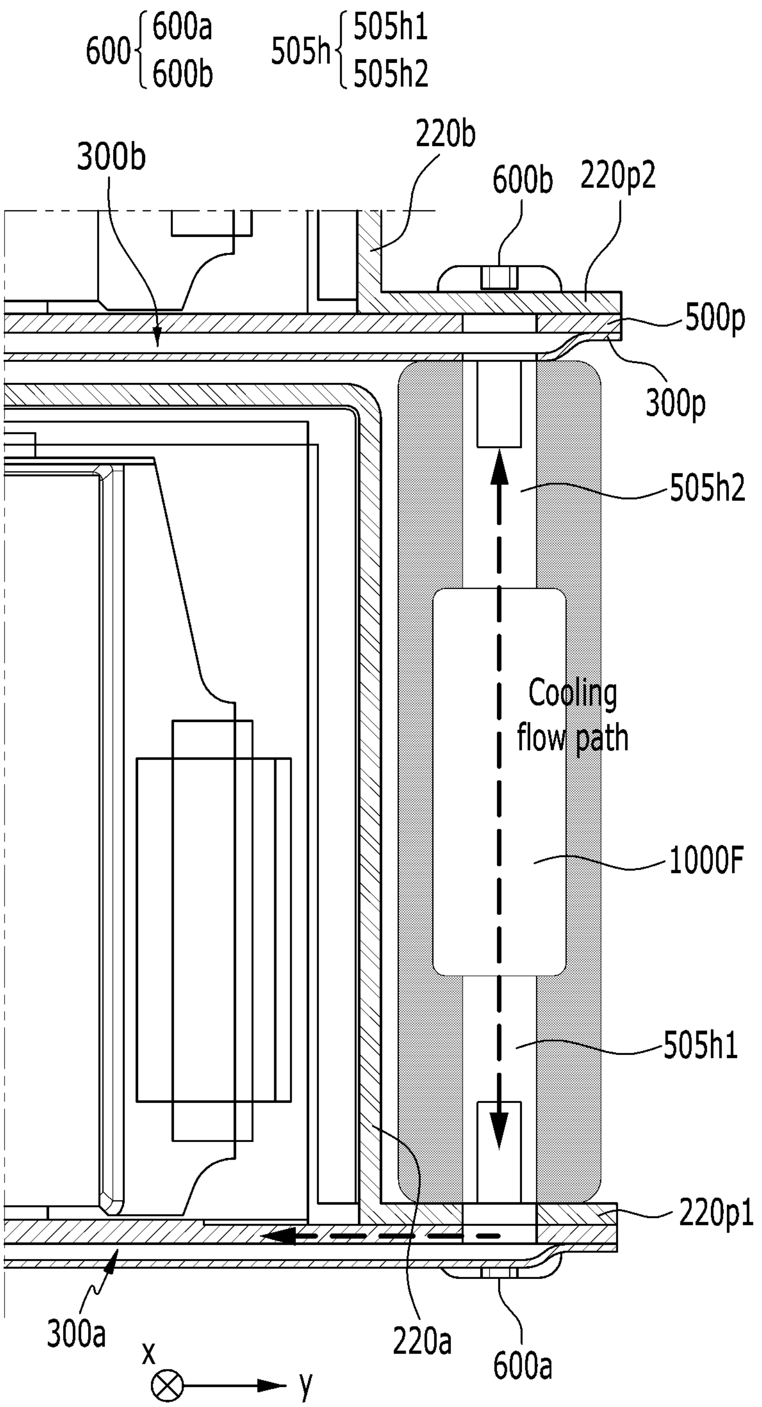

【FIG. 7】
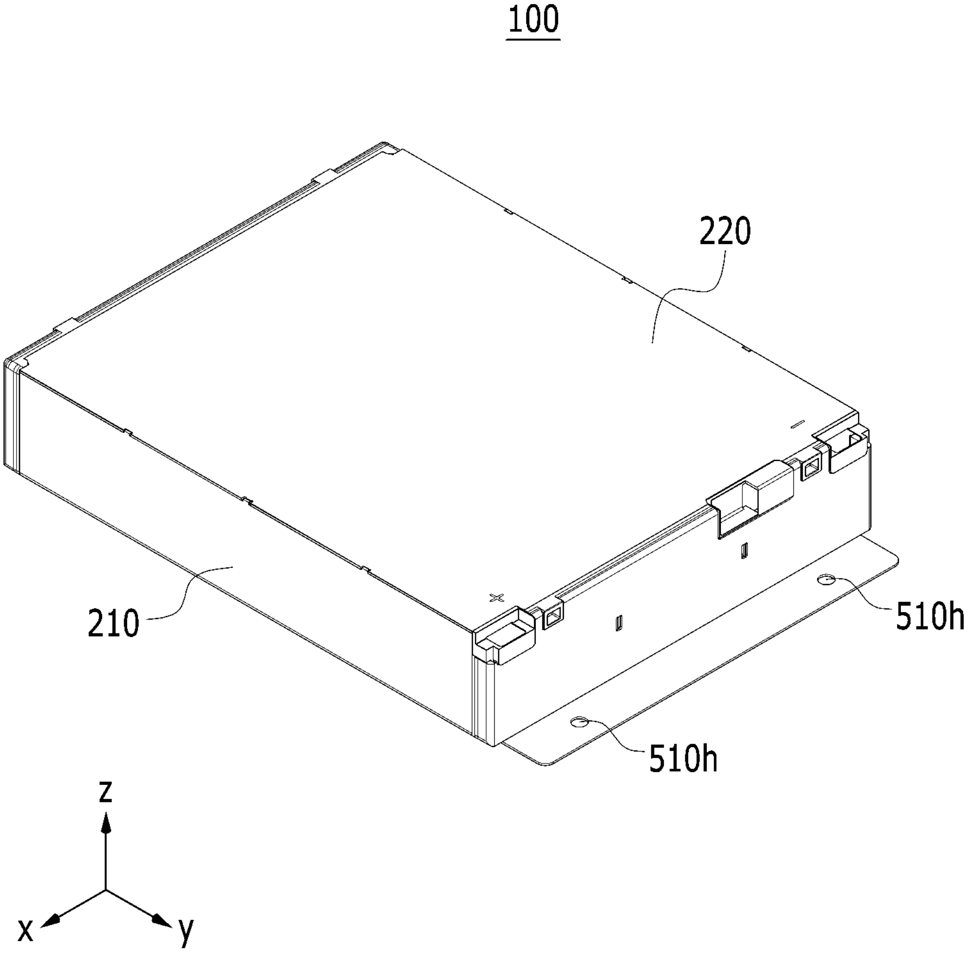

【FIG. 8】
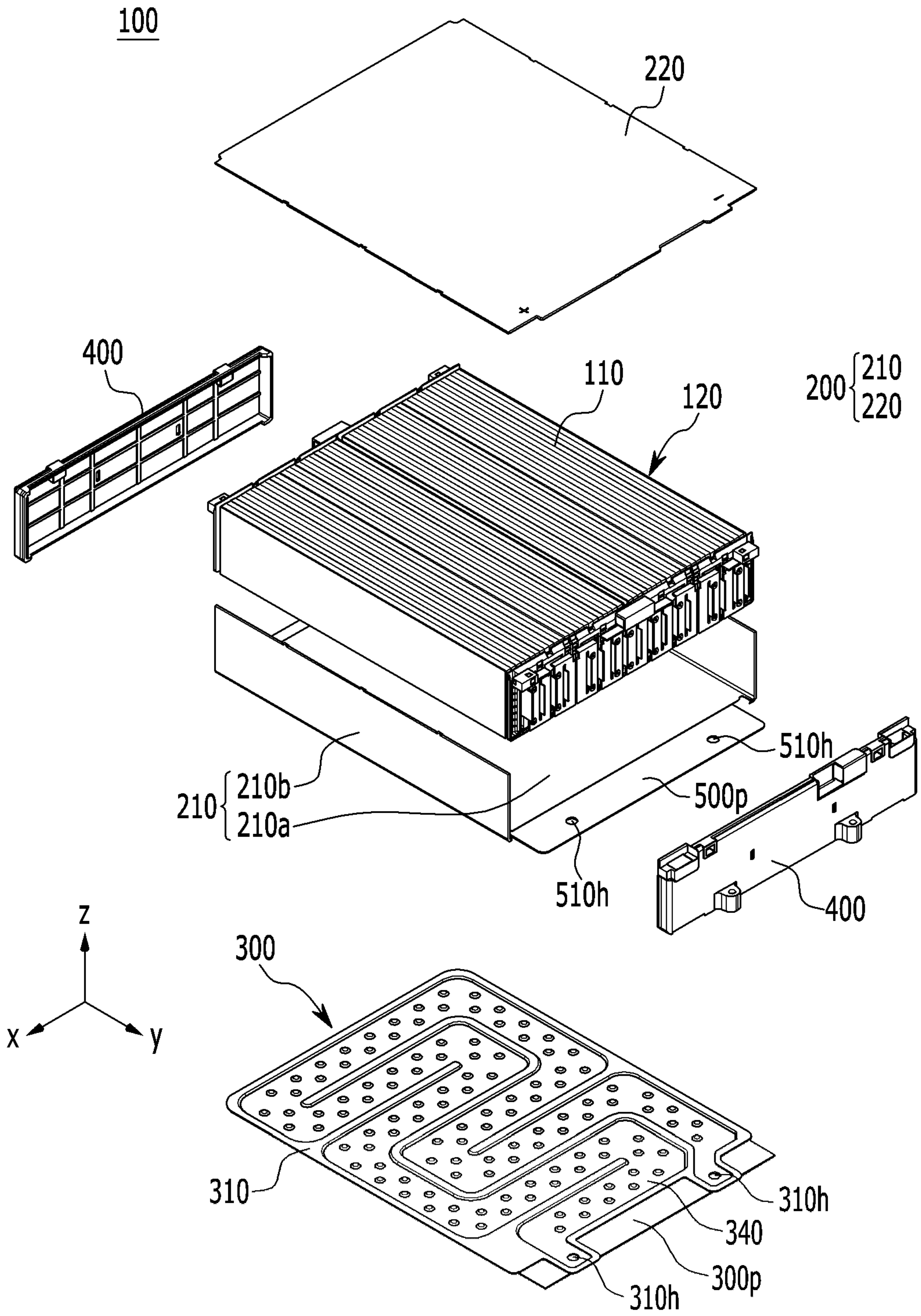

【FIG. 9】
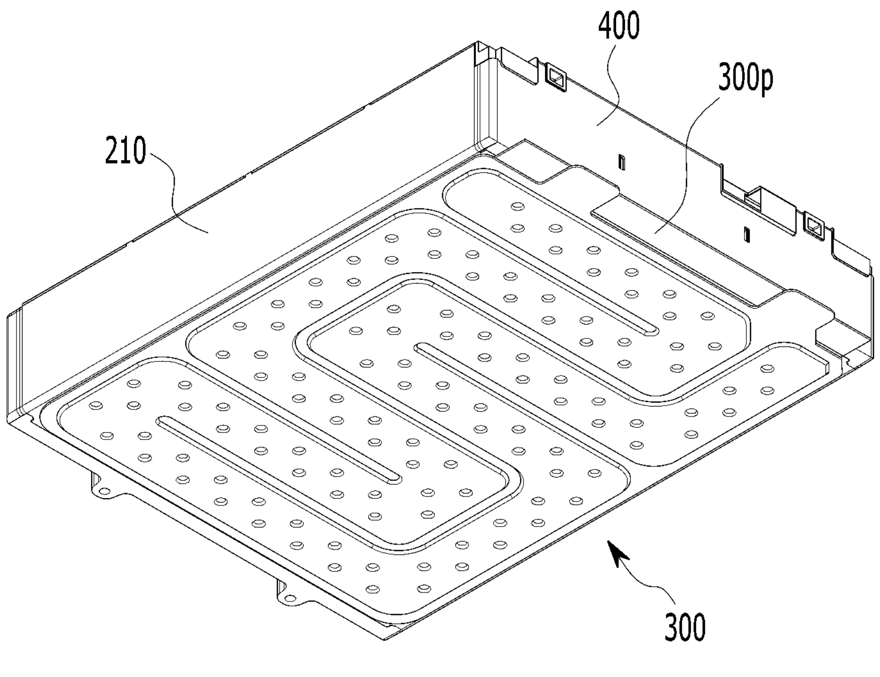

BATTERY PACK AND DEVICE INCLUDING THE SAME

CROSS CITATION WITH RELATED APPLICATION(S)

This application claims the benefit of Korean Patent Application No. 10-2020-0134032 filed on Oct. 16, 2020 with the Korean Intellectual Property Office, the disclosure of which is incorporated herein by reference in its entirety.

The present disclosure relates to a battery pack and a device including the same, and more particularly, to a battery pack that has a simplified cooling structure and improves space utilization, and a device including the same.

BACKGROUND ART

In modern society, as portable devices such as a mobile phone, a notebook computer, a camcorder and a digital camera has been daily used, the development of technologies in the fields related to mobile devices as described above has been activated. In addition, chargeable/dischargeable secondary batteries are used as a power source for an electric vehicle (EV), a hybrid electric vehicle (HEV), a plug-in hybrid electric vehicle (P-HEV) and the like, in an attempt to solve air pollution and the like caused by existing gasoline vehicles using fossil fuel. Therefore, there is a growing need for development of the secondary battery.

Currently commercialized secondary batteries include a nickel cadmium battery, a nickel hydrogen battery, a nickel zinc battery, and a lithium secondary battery. Among them, the lithium secondary battery has come into the spotlight because they have advantages, for example, hardly exhibiting memory effects compared to nickel-based secondary batteries and thus being freely charged and discharged, and having very low self-discharge rate and high energy density.

Such lithium secondary battery mainly uses a lithium-based oxide and a carbonaceous material as a positive electrode active material and a negative electrode active material, respectively. The lithium secondary battery includes an electrode assembly in which a positive electrode plate and a negative electrode plate respectively coated with the positive electrode active material and the negative electrode active material are disposed with a separator being interposed between them, and a battery case which seals and accommodates the electrode assembly together with an electrolyte solution.

Generally, the lithium secondary battery may be classified based on the shape of the exterior material into a can type secondary battery in which the electrode assembly is built in a metal can, and a pouch-type secondary battery in which the electrode assembly is built in in a pouch of an aluminum laminate sheet.

In the case of a secondary battery used for small-sized devices, two to three battery cells are disposed, but in the case of a secondary battery used for a middle or large-sized device such as an automobile, a battery module in which a large number of battery cells are electrically connected is used. In such a battery module, a large number of battery cells are connected to each other in series or parallel to form a cell stack, thereby improving capacity and output. In addition, one or more battery modules can be mounted together with various control and protection systems such as a battery management system (BMS) and a cooling system to form a battery pack.

When the temperature of the secondary battery rises higher than an appropriate temperature, the performance of the secondary battery may be deteriorated, and in the worst case, there is also a risk of an explosion or ignition. In particular, a large number of secondary batteries, that is, a battery module or a battery pack having battery cells, can add up the heat generated from the large number of battery cells in a narrow space, so that the temperature can rise more quickly and severely. In other words, a battery module in which a large number of battery cells are stacked, and a battery pack equipped with such a battery module can obtain high output, but it is not easy to remove heat generated from the battery cells during charging and discharging. When the heat dissipation of the battery cell is not properly performed, deterioration of the battery cells is accelerated, the lifespan is shortened, and the possibility of explosion or ignition increases.

Moreover, in the case of a battery module contained in a vehicle battery pack, it is frequently exposed to direct sunlight and can be subjected to high-temperature conditions such as summer or desert areas. Therefore, when a battery module or a battery pack is configured, it may be very important to stably and effectively ensure the cooling performance.

FIG. 1 is a partial perspective view of a conventional battery pack, and FIG. 2 is a partial perspective view illustrating a method of mounting a battery module contained in the battery pack of FIG. 1.

Referring to FIGS. 1 and 2, a conventional battery pack may include a plurality of battery modules 10 and a pack frame 11 for accommodating the plurality of battery modules. For convenience of explanation, only one battery module is shown in FIG. 1.

The conventional battery pack is provided with a refrigerant pipe for cooling the battery module 10, and the refrigerant is supplied through the refrigerant pipe connector 13 connected to the refrigerant pipe. This refrigerant is usually a cooling water, and a fluid indirect cooling structure is applied in which the temperature is lowered by flowing such cooling water in the inside of the battery pack.

Meanwhile, when the battery module 10 is accommodated in the pack frame 11, mounting holes are provided at four corners, and the mounting bolt 12 can pass through the mounting hole to be fastened to the pack frame 11. Such a mounting coupling may be made for each battery module 10.

In this case, the cooling configuration such as the coolant tube connector 13 for cooling the battery module 10 and the mounting configuration such as the mounting bolt 12 for mounting the battery module 10 are separate configurations, and there is a problem that the number of parts is large and complicated for each configuration.

In addition, a situation may occur in which the refrigerant leaks from the refrigerant pipe or the refrigerant pipe connector 13 due to assembly defects or accidents during operation. The refrigerant thus leaked may penetrate into the inside of the battery pack and cause a fire or explosion.

Therefore, there is a need to develop a battery pack capable of minimizing damage caused by the leakage of the refrigerant while improving cooling performance.

In addition, the vehicle battery pack is generally formed in a single-layer structure by arranging a plurality of battery modules or battery module assemblies on the same plane in order to maintain structural stability. However, when the battery pack composed of a single layer structure as described above is mounted in an electric vehicle requiring high capacity and high output so that additional capacity is required, there are many structural limitations in increasing capacity. Further, it is difficult to structurally expand the cooling device according to the addition of capacity.

Therefore, there is a high need for a technology capable of fundamentally solving these problems.

DETAILED DESCRIPTION OF THE INVENTION

Technical Problem

It is an object of the present disclosure to provide a battery pack that has a simplified cooling structure and improves space utilization, and a device including the same.

However, the technical problem to be solved by embodiments of the present disclosure is not limited to the above-described problems, and can be variously expanded within the scope of the technical idea included in the present disclosure.

Technical Solution

According to one embodiment of the present disclosure, there is provided a battery pack comprising: a first battery module including a first battery cell stack in which a plurality of first battery cells are stacked, a first module frame for accommodating the first battery cell stack, and a first cooling plate located below a bottom portion of the first module frame, a second battery module including a second battery cell stack in which a plurality of second battery cells are stacked, a second module frame for accommodating the second battery cell stack, and a second cooling plate located below a bottom portion of the second module frame, a pack frame for accommodating the first and second battery modules, and a cooling pipe that connects the first cooling plate and the second cooling plate and is formed along one side part of the first battery module. The first cooling plate and the second cooling plate are vertically stacked.

At least one mounting member may be coupled to at least one of an upper end or a lower end of the cooling pipe.

A tapping portion to which the mounting member is mounted may be formed in at least one of the upper end or the lower end of the cooling pipe.

A cooling flow path through which refrigerant flows may be formed in a central portion of the cooling pipe.

The cooling flow path may extend along a direction in which the at least one mounting member is arranged.

The battery pack may further include a first module cover covering an upper part of the first battery stack, and a second module cover covering an upper part of the second battery stack, wherein the first module cover includes a first protruding cover protruding from the first module cover to the lower end of the cooling pipe, and the second module cover includes a second protruding cover protruding from the second module cover to the upper end of the cooling pipe, and wherein the cooling pipe is located between the first protruding cover and the second protruding cover.

The mounting member passes through the first protruding cover and is mounted on the tapping portion of the lower end of the cooling pipe, or passes through the second protruding cover and is mounted on the tapping portion of the upper end of the cooling pipe.

A plurality of hole portions are formed in an upper end part and a lower end part of the cooling pipe, and the refrigerant of the cooling pipe may flow into the first cooling plate and the second cooling plate through the hole portions.

The hole portions may communicate with the cooling flow path.

Through holes may be formed in the first protruding cover portion and the second protruding cover portion corresponding to the hole portions, and sealing members may be formed in the through holes.

The bottom portion of each of the first and second module frames may constitute an upper plate of the first and second cooling plates, respectively, and bottom portions of each of the first and module frames may come into contact with the refrigerant.

Each of the first and second module frames includes a module frame protrusion portion formed by protruding the bottom portion of each of the first and second module frames, and a through hole into which a sealing member is inserted may be formed in the module frame protrusion portion of each of the first and second module frames.

Each of the first and second cooling plates may include a cooling plate protrusion portion protruding from one side of the first and second cooling plates to a portion where the module frame protrusion portion of each of the first and second cooling plates are located, respectively.

According to another embodiment of the present disclosure, there is provided a device comprising the above-mentioned battery pack.

Advantageous Effects

According to embodiments of the present disclosure, the cooling structure and the mounting structure can be integrated, so that the mounting structure and the cooling structure, which may be complicated when stacking at least two-stage battery modules, can be simplified at a maximum extent.

The cooling performance can be improved through the integrated structure of the module frame and the cooling plate.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a partial perspective view of a conventional battery pack;

FIG. 2 is a partial perspective view illustrating a method of mounting a battery module contained in the battery pack of FIG. 1;

FIG. 3 is a perspective view illustrating a battery module and a pack frame contained in the battery pack according to an embodiment of the present disclosure;

FIG. 4 is a perspective view of the battery pack of FIG. 3 as viewed along the y-axis direction, which is a different angle;

FIG. 5 is a cross-sectional view taken along the cutting line A-A of FIG. 4;

FIG. 6 is a cross-sectional view taken along the cutting line B-B of FIG. 4;

FIG. 7 is a perspective view of a battery module contained in the battery pack of FIG. 3;

FIG. 8 is an exploded perspective view of the battery module of FIG. 7; and FIG. 9 is a perspective view of the battery module of FIG. 7 as viewed from bottom to top of the battery module along the z-axis direction.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the figures, the size and thickness of each element are arbitrarily illustrated for convenience of description, and the present disclosure is not necessarily limited to those illustrated in the figures. In the figures, the thickness of layers, regions, etc. are exaggerated for clarity. In the figures, for convenience of description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

FIG. 3 is a perspective view illustrating a battery module and a pack frame contained in the battery pack according to an embodiment of the present disclosure. FIG. 4 is a perspective view of the battery pack of FIG. 3 as viewed along the y-axis direction, which is a different angle. FIG. 5 is a cross-sectional view taken along the cutting line A-A of FIG. 4. FIG. 6 is a cross-sectional view taken along the cutting line B-B of FIG. 4.

Referring to FIGS. 3 and 4, a battery pack according to an embodiment of the present disclosure include a plurality of battery modules 100 arranged vertically and horizontally, and a pack frame 1100 for accommodating a plurality of battery modules 100. The battery module 100 may include a battery cell stack in which a plurality of battery cells are stacked, a module frame for accommodating the battery cell stack, and a cooling plate located below the bottom portion of the module frame.

Referring to FIGS. 3 to 5, a first cooling plate 300*a* and a second cooling plate 300*b* are formed under each of the first battery module 100*a* and the second battery module 100*b* stacked vertically among the plurality of battery modules 100. The battery pack according to the embodiment of the present disclosure includes a cooling pipe 1000 that connects the first cooling plate 300*a* and the second cooling plate 300*b* and is formed along one side part of the first battery module 100*a*.

At least one mounting member 500 is coupled to at least one of an upper end and a lower end of the cooling pipe 1000. A tapping portion 505 on which the mounting member 500 is mounted is formed in at least one of the upper end and the lower end of the cooling pipe 1000. The tapping portion 505 may be a portion in which a part of a member constituting the cooling pipe is cut so that the mounting member 500 is mounted.

A cooling flow path 1000F through which the refrigerant flows is formed in the central portion of the cooling pipe 1000. The cooling flow path 1000F extends along a direction in which the at least one mounting member 500 is arranged. The cooling flow path 1000F may have a structure in which the cooling flow path 1000F extends long along the x-axis direction shown in FIGS. 4 and 5.

According to the embodiment of the present disclosure, the first mounting member 500*a* is mounted to the first tapping portion 505*a* that is formed at the lower end of the cooling pipe 1000 with respect to the cooling passage 1000F, and the second mounting member 500*b* may be mounted to the second tapping portion 505*b* that is formed at the upper end of the cooling pipe 1000.

Referring to FIGS. 3 to 5, the battery pack according to the embodiment of the present disclosure may further include a first module cover 220*a* covering one side part of the first battery module 100*a*, and a second module cover 220*b* covering one side part of the second battery module 100*b*. The first module cover 220*a* includes a first protruding cover 220*p*1 protruding from the first module cover 220*a* to the lower end of the cooling pipe 1000, and the second module cover 220*b* may include a second protruding cover 220*p*2 protruding from the second module cover 220*b* to the upper end of the cooling pipe 1000. In this case, the cooling pipe 1000 may be located between the first protruding cover 220*p*1 and the second protruding cover 220*p*2.

The mounting member 500 according to the embodiment of the present disclosure can pass through the first protruding cover 220*p*1 and is mounted on the tapping portion 505, or pass through the second protruding cover 220*p*2 and is mounted on the tapping portion 505. At this time, the module frame protrusion portion 500*p* and the cooling plate protrusion portion 300*p* overlap with the first protrusion covers 220*p*1 and the second protruding cover 200*p*2, and the mounting member 500 may be inserted through a hole penetrating the module frame protrusion portion 500*p*, the cooling plate protrusion portion 300*p*, the first protrusion cover 220*p*1 and the second protruding cover 200*p*2. The module frame protrusion portion 500*p* and the cooling plate protrusion portion 300*p* will be described hereinafter.

Referring to FIGS. 4 and 6, a plurality of hole portions 505*h* are formed in at least one of the upper end and the lower end of the cooling pipe 1000, and the refrigerant of the cooling pipe 1000 may flow into the first cooling plate 300*a* and the second cooling plate 300*b* through the hole portions 505*h*. The hole portion 505*h* may communicate with the cooling flow path 1000F. A through hole is formed in the portions of the first protruding cover 220*p*1 and the second protruding cover 220*p*2 corresponding to the hole portions 505*h*, and a sealing member 600 may be formed in the through hole.

According to the embodiment of the present disclosure, the first sealing member 600*a* is mounted on the first hole portion 505*h*1 formed at the lower end of the cooling pipe 1000 with respect to the cooling flow path 1000F, and a second sealing member 600*b* may be mounted in the second hole 505*h*2 formed at the upper end of the cooling pipe 1000. The sealing member 600 may be a gasket.

The module frame protrusion portion 500*p* and the cooling plate protrusion portion 300*p* overlap with the first protrusion cover 220*p*1 and the second protruding cover 200*p*2, and the sealing member 600 may be inserted through a hole penetrating through the module frame protrusion portion 500*p*, the cooling plate protrusion portion 300*p*, the first protrusion cover 220*p*1 and the second protruding cover 200*p*2.

As described above, according to the embodiment of the present disclosure, since the cooling structure and the mounting structure are integrally formed through the cooling pipe, the pack assembling property can be improved through the simplification of assembly. The cost reduction effect is also high through the reduction of the manufacturing process, and the rigidity can be improved through the layered connection structure.

FIG. 7 is a perspective view of a battery module contained in the battery pack of FIG. 3. FIG. 8 is an exploded perspective view of the battery module contained in the battery pack FIG. 7. Referring to FIGS. 3, 7 and 8, the battery module 100 according to an embodiment of the present disclosure includes a battery cell stack 120 in which a plurality of battery cells 110 are stacked and a module frame 200 for accommodating the battery cell stack 120. In addition, the battery module 100 may include a cooling plate 300 located below the bottom portion 210*a* of the module frame 200, and the refrigerant may be supplied to the cooling plate 300 through the through hole 310*h* and the refrigerant can be discharged from the cooling plate 300.

The battery cell 110 may be a pouch-type battery cell. Such a pouch-type battery cell may be formed by accommodating an electrode assembly in a pouch case of a laminate sheet including a resin layer and a metal layer, and then thermally sealing the outer periphery of the pouch case. In this case, the battery cell 110 may be formed in a rectangular sheet-like structure.

The battery cells 110 may be configured in a plurality of cells, and the plurality of battery cells 110 are stacked so as to be electrically connected to each other, thereby forming the battery cell stack 120. In particular, as shown in FIG. 8, a plurality of battery cells 110 can be stacked in a direction parallel to the x-axis.

The module frame 200 for accommodating the battery cell stack 120 may include an upper plate 220 and a frame member 210. The frame member 210 may be U-shaped. The frame member 210 may include a bottom portion 210*a* and two side surface portions 210*b* extending upward from both ends of the bottom portion 210*a*. The bottom portion 210*a* may cover the lower surface (direction opposite to the z-axis) of the battery cell stack 120, and the side surface portion 210*b* may cover both side surfaces (the x-axis direction and the direction opposite to the same) of the battery cell stack 120.

The upper plate 220 may be formed in a single plate-shaped structure that wraps the lower surface wrapped by the frame member 210 and the remaining upper surface (z-axis direction) excluding the both side surfaces. The upper plate 220 and the frame member 210 can be joined by welding or the like in a state in which the corresponding corner portions are in contact with each other, thereby forming a structure that covers the battery cell stack 120 vertically and horizontally. The battery cell stack 120 can be physically protected through the upper plate 220 and the frame member 210. For this purpose, the upper plate 220 and the frame member 210 may include a metal material having a predetermined strength.

Meanwhile, although not specifically shown, the module frame 200 according to modified embodiments of the present disclosure may be a mono frame in the form of a metal plate in which the upper surface, the lower surface, and both side surfaces are integrated. That is, the module frame is not a structure in which the frame member 210 and the upper plate 220 are joined with each other, but a structure in which the upper surface, the lower surface, and both side surfaces are integrated by being manufactured by extrusion molding.

The end plate 400 may be located on both open sides (y-axis direction and direction opposite to the same) corresponding to each other of the module frame 200, so that it can be formed so as to cover the battery cell stack 120. The end plate 400 can physically protect the battery cell stack 120 and other electronic instruments from external impact.

Meanwhile, although not specifically shown, a busbar frame on which a busbar is mounted and an insulating cover for electrical insulation may be located between the battery cell stack 120 and the end plate 400.

The module frame 200 according to embodiments of the disclosure includes a module frame protrusion portion 500*p* formed so that the bottom portion 210*a* of the module frame 200 is extended and passes through the end plate 400. At this time, a plurality of through-holes are formed in the module frame protrusion portion 500*p*, and the mounting member 500 and the sealing member 600 described with reference to FIGS. 4 to 6 can be inserted into the plurality of through holes.

Hereinafter, the cooling plate according to the embodiment of the present disclosure will be described in detail with reference to FIGS. 8 and 9.

FIG. 9 is a perspective view of the battery module of FIG. 7 as viewed from bottom to top of the battery module along the z-axis direction.

Referring to FIGS. 8 and 9, the bottom portion 210*a* of the module frame 200 constitutes an upper plate of the cooling plate 300, and a recessed portion 340 of the cooling plate 300 and the bottom portion 210*a* of the module frame 200 form a flow path for refrigerant. Specifically, a cooling plate 300 may be formed at a lower portion of the module frame 200, and the cooling plate 300 may include a lower plate 310 that forms a skeleton of the cooling plate 300 and is directly coupled to the bottom portion 210*a* of the module frame 200, and a recessed part 340, which is a path through which the refrigerant flows. Further, the cooling plate 300 may include a cooling plate protrusion portion 300*p* protruding from one side of the cooling plate 300 to the portion where the module frame protrusion portion 211 is located. The cooling plate protrusion portion 300*p* and the module frame protrusion portion 500*p* may be directly coupled to each other by a method such as welding.

The recessed portion 340 of the cooling plate 300 corresponds to a portion in which the lower plate 310 is formed to be recessed on the lower side. The recessed portion 340 may be a U-shaped tube in which a cross section cut perpendicularly to the xz plane with respect to the direction in which the refrigerant flow path extends has U-shape, and the bottom portion 210*a* may be located on the opened upper side of the U-shaped tube. While the cooling plate 300 comes into contact with the bottom portion 210*a*, the space between the recessed portion 340 and the bottom portion 210*a* forms a region through which the refrigerant flows, that is, a refrigerant flow path. Thereby, the bottom portion 210*a* of the module frame 200 can come into contact with the refrigerant.

The method of manufacturing the recessed portion 340 of the cooling plate 300 is not particularly limited, but a U-shaped recessed portion 340 with an opened upper side can be formed by providing a structure formed to recessed with respect to a plate-shaped cooling plate 300. The recessed portion 340 may be connected from one of the cooling plate protrusion portions 300*p* to the other. Meanwhile, although not shown, a thermal conductive resin layer containing a thermal conductive resin may be located between the bottom portion 210*a* of the module frame 200 of FIG. 7 and the battery cell stack 120. The thermal conductive resin layer may be formed by applying a thermal conductive resin to the bottom portion 210*a*, and curing the applied thermal conductive resin.

The thermal conductive resin may include a thermal conductive adhesive material, and specifically, may include at least one of silicone material, urethan material, and acrylic material. The thermal conductive resin is a liquid during application but is cured after application, so that it can perform the role of fixing one or more battery cells 110 constituting the battery cell stack 120. Further, since the thermal conductive resin has excellent heat transfer properties, heat generated from the battery cell 110 can be quickly transferred to the lower side of the battery module.

The conventional battery module is configured such that the heat generated from battery cells passes through a thermal conductive resin layer, a bottom portion of the module frame, a heat transfer member, and a refrigerant of a cooling plate in this order, and then is transferred to the outside of the battery module. In addition, the flow path of the refrigerant of the cooling plate is located inside the cooling plate. On the other hand, the battery module 100 according to embodiments of the present disclosure can realize an integrated type cooling structure of the module frame 200 and the cooling plate 300 to further improve cooling performance. The bottom portion 210*a* of the module frame 200 can perform the role of corresponding to the upper plate of the cooling plate 300, thereby realizing the integrated type cooling structure. The cooling efficiency due to direct cooling can be increased, and through a structure in which the cooling plate 300 is integrated with the bottom portion 210*a* of the module frame 200, the space utilization rate on the battery module and the battery pack equipped with the battery module 100 can be further improved.

Specifically, the heat generated from the battery cell 110 can pass through a thermal conductive resin layer (not shown) located between the battery cell stack 120 and the bottom portion 210*a*, the bottom portion 210*a* of the module frame 200, and the refrigerant, and then can be transferred to the outside of the battery module 100. By removing the unnecessary cooling structure according to the conventional one, the heat transfer passage can be simplified and an air gap between respective layers can be reduced, so that the cooling efficiency or performance can be enhanced. In particular, since the bottom portion 210*a* is configured as an upper plate of the cooling plate 300 and the bottom portion 210*a* comes into contact with the refrigerant, there is an advantage that more direct cooling through the refrigerant can be performed.

Further, through the removal of the unnecessary cooling structure, the height of the battery module 100 is reduced and thus, the cost can be reduced and space utilization rate can be increased. Furthermore, since the battery module 100 can be disposed in a compact manner, the capacity or output of the battery pack including a plurality of battery modules 100 can be increased.

Meanwhile, the bottom portion 210*a* of the module frame 200 can be joined by welding to a portion of the lower plate 310 in which the recessed portion 340 is not formed among the cooling plate 300. In embodiments of the present disclosure, through the integrated type cooling structure of the bottom portion 210*a* of the module frame 200 and the cooling plate 300, it can exhibit the effects of not only improving the cooling performance described above, but also supporting the load of the battery cell stack 120 accommodated in the module frame 200 and reinforcing the rigidity of the battery module 100. In addition, the lower plate 310 and the bottom portion 210*a* of the module frame 200 are sealed by welding or the like, so that the refrigerant can flow without leakage in the recessed portion 340 formed inside the lower plate 310.

For effective cooling, as shown in FIG. 8, the recessed portion 340 is preferably formed over the entire region corresponding to the bottom portion 210*a* of the module frame 200. For this purpose, the recessed portion 340 can be curved at least one time to connect from one side to another side. In particular, the recessed portion 340 is preferably curved several times so that the recessed portion 340 is formed over the entire region corresponding to the bottom portion 210*a* of the module frame 200. As the refrigerant moves from the start point to the end point of the refrigerant flow path formed over the entire region corresponding to the bottom portion 210*a* of the module frame 200, efficient cooling can be performed over the entire region of the battery cell stack 120. Meanwhile, the refrigerant is a medium for cooling and is not particularly limited, but it may be a cooling water.

The above-mentioned battery pack and battery pack including the same can be applied to various devices. Such a device may be applied to a vehicle means such as an electric bicycle, an electric vehicle, or a hybrid vehicle, but the present disclosure is not limited thereto, and is applicable to various devices that can use a battery module, which also belongs to the scope of the present disclosure.

Although the invention has been shown and described with reference to the preferred embodiments, the scope of the present disclosure is not limited thereto, and numerous other modifications and embodiments can be devised by those skilled in the art that will fall within the spirit and scope of the principles of the invention defined in the appended claims.

DESCRIPTION OF REFERENCE NUMERALS

1000: cooling pipe 1000F: cooling flow path
300: cooling plate 500: mounting member
505: tapping part 505*h*: hole portion
600: sealing member 220*a*, 220*b*: first and second module covers
220*p*1, 200*p*2: first and second protruding covers

The invention claimed is:

1. A battery pack comprising:

a first battery module including a first battery cell stack in which a plurality of first battery cells are stacked, a first module frame for accommodating the first battery cell stack, and a first cooling plate located below a bottom portion of the first module frame;

a second battery module including a second battery cell stack in which a plurality of second battery cells are stacked, a second module frame for accommodating the second battery cell stack, and a second cooling plate located below a bottom portion of the second module frame;

a pack frame for accommodating the first and second battery modules; and a cooling pipe connecting the first cooling plate and the second cooling plate, the cooling pipe formed along one side part of the first battery module, wherein the first cooling plate and the second cooling plate are vertically stacked, wherein at least one mounting member is coupled to at least one of an upper end or a lower end of the cooling pipe, and wherein a tapping portion to which the mounting member is mounted is formed in at least one of the upper end or the lower end of the cooling pipe.

2. The battery pack of claim 1, wherein:

a cooling flow path through which refrigerant flows is formed in a central portion of the cooling pipe.

3. The battery pack of claim 2, wherein:

the cooling flow path extends along a direction in which the at least one mounting member is arranged.

4. The battery pack of claim 2, further comprising:

a first module cover covering an upper part of the first battery cell stack; and a second module cover covering an upper part of the second battery cell stack, wherein the first module cover includes a first protruding cover protruding from the first module cover to the lower end of the cooling pipe, and the second module cover includes a second protruding cover protruding from the second module cover to the upper end of the cooling pipe, and wherein the cooling pipe is located between the first protruding cover and the second protruding cover.

5. The battery pack of claim 4, wherein:

the mounting member passes through the first protruding cover and is mounted on the tapping portion of the lower end of the cooling pipe, or passes through the second protruding cover and is mounted on the tapping portion of the upper end of the cooling pipe.

6. The battery pack of claim 4, wherein:

a plurality of hole portions are formed in an upper end part and a lower end part of the cooling pipe, and the refrigerant of the cooling pipe flows into the first cooling plate and the second cooling plate through the hole portions.

7. The battery pack of claim 6, wherein:

the hole portions communicate with the cooling flow path.

8. The battery pack of claim 6, wherein:

through holes are formed in the first protruding cover portion and the second protruding cover portion corresponding to the hole portions, and sealing members are formed in the through holes.

9. The battery pack of claim 1, wherein:

the bottom portion of each of the first and second module frames constitutes an upper plate of the first and second cooling plates, respectively, and the bottom portion of each of the first and second module frames comes into contact with refrigerant located in the first and second cooling plates.

10. The battery pack of claim 9, wherein:

each of the first and second module frames includes a module frame protrusion portion formed by protruding the bottom portion of each of the first and second module frames, and a through hole into which a sealing member is inserted is formed in the module frame protrusion portion of each of the first and second module frames.

11. The battery pack of claim 10, wherein:

each of the first and second cooling plates includes a cooling plate protrusion portion protruding from one side of the first and second cooling plates to a portion where the module frame protrusion portion of each of the first and second cooling plates are located, respectively.

12. A device comprising the battery pack of claim 1.

* * * * *